US007222193B2

(12) United States Patent
Stringer

(10) Patent No.: US 7,222,193 B2
(45) Date of Patent: May 22, 2007

(54) COMPUTER NETWORK PAYMENT SYSTEM

(76) Inventor: Andrew Mark Stringer, 14 Berkeley Close, Hill Head, Fareham, Hampshire (GB) PO14 3NW ( * ) Notice: Subject to any disclaimer, the term of this patent is extended or adjusted under 35 U.S.C. 154(b) by 731 days.

(21) Appl. No.: 10/039,565
(22) Filed: Dec. 21, 2001

(65) Prior Publication Data
US 2002/0083186 A1    Jun. 27, 2002

Related U.S. Application Data

(63) Continuation of application No. PCT/GB00/02413, filed on Jun. 21, 2000.

(30) Foreign Application Priority Data
Jun. 22, 1999    (GB)    ................................ 9914418.0

(51) Int. Cl.
*G06F 15/16*    (2006.01)
(52) U.S. Cl. ........................ 709/246; 709/203; 709/236
(58) Field of Classification Search ................ 709/203, 709/219, 236, 238, 246; 705/52–53
See application file for complete search history.

(56) References Cited

U.S. PATENT DOCUMENTS 3,979,733 A * 9/1976 Fraser ........................ 710/316
4,933,931 A * 6/1990 Kokubo ........................ 370/259

(Continued)

FOREIGN PATENT DOCUMENTS

EP    537756    4/1993

(Continued)

OTHER PUBLICATIONS

Naik, Dilip C. "Internet Standards and Protocols: The Profession Desktop Reference", Microsoft Press, 1998, pp. 35-40 and 206-207.*

(Continued)

*Primary Examiner*—David Wiley
*Assistant Examiner*—George C. Neurauter, Jr.
(74) *Attorney, Agent, or Firm*—Thompson Coburn LLP

(57) ABSTRACT

A method of electronic payment for data transferred across a computer network from a server to a client by means of at least one router which forwards data. An electronic data request is sent from the client to the server via one or more routers. The server then sends electronic data to the client via one or more routers in response to said electronic data request. The electronic data is sent via a packet transfer protocol, in which each packet of data has associated with it a data field containing a value, which represents the commercial value of the requested data. Each router receives an incoming data packet, reads the value in the data field associated with the incoming data packet, calculates a new value based on the read value and the cost of forwarding the data packet, and forwards the data packet with the new value in the associated data field. Each router can check whether the value in the data field associated with the incoming data packet falls within predefined parameters and rejects the packet if the value falls outside the predefined parameters, for example if the value of the data is too high. Each router stores the accumulated value of received and forwarded data, so that payments may be made to the operator of the router.

12 Claims, 2 Drawing Sheets

U.S. PATENT DOCUMENTS

| | | | | |
|---|---|---|---|---|
| 5,406,555 | A | * | 4/1995 | Yoshida ...................... 370/252 |
| 5,481,534 | A | * | 1/1996 | Beachy et al. ............... 370/259 |
| 5,634,012 | A | * | 5/1997 | Stefik et al. ................... 705/39 |
| 5,754,787 | A | | 5/1998 | Dedrick |
| 5,771,289 | A | * | 6/1998 | Kuzma ........................ 713/153 |
| 5,826,098 | A | * | 10/1998 | Kanekura et al. ............. 712/26 |
| 5,910,987 | A | | 6/1999 | Ginter et al. |
| 5,953,334 | A | * | 9/1999 | Morita et al. ................ 370/389 |
| 6,011,778 | A | * | 1/2000 | Kilkki et al. ................ 370/232 |
| 6,047,326 | A | * | 4/2000 | Kilkki ........................ 709/228 |
| 6,088,687 | A | * | 7/2000 | Leleu ......................... 705/400 |
| 6,130,889 | A | * | 10/2000 | Feldman et al. ............ 370/397 |
| 6,202,056 | B1 | * | 3/2001 | Nuttall ........................ 705/52 |
| 6,208,977 | B1 | | 3/2001 | Hernandez et al. |
| 6,230,144 | B1 | * | 5/2001 | Kilkki et al. ................. 705/30 |
| 6,240,402 | B1 | * | 5/2001 | Lynch-Aird ................ 705/400 |
| 6,295,294 | B1 | * | 9/2001 | Odlyzko ..................... 370/389 |
| 6,338,046 | B1 | * | 1/2002 | Saari et al. ................... 705/34 |
| 6,370,119 | B1 | * | 4/2002 | Basso et al. ................ 370/252 |
| 6,418,467 | B1 | * | 7/2002 | Schweitzer et al. ......... 709/223 |
| 6,480,485 | B1 | * | 11/2002 | Kari et al. .................. 370/352 |
| 6,490,287 | B1 | * | 12/2002 | Kilkki ................... 370/395.42 |
| 6,493,318 | B1 | * | 12/2002 | Bare .......................... 370/238 |
| 6,515,989 | B1 | * | 2/2003 | Ronneke ..................... 370/389 |
| 6,819,672 | B1 | * | 11/2004 | Corneliussen ............ 370/395.1 |

FOREIGN PATENT DOCUMENTS

EP            788080           8/1997

OTHER PUBLICATIONS

Darpa. "Request for Comments (RFC) 791: Internet Protocol", Information Sciences Institute, Sep. 1981, 51 pages.*

Farley, Tom. "Packet Switching and Ciruit Switching; An Always On Connection", published on <telecomwriting.com>, http://web.archive.org/web/20010606163819/http://privateline.com/Switching/packet.html, 6 pages.*

USHA Communications Technology. "General Packet Radio Service: A White Paper", Jun. 26, 2000, 23 pages.*

Simpson, W. "Request for Comments (RFC) 1598: PPP in X.25", published by Network Working Group, 9 pages.*

Almquist, P. "Request for Comments (RFC) 1349: Type of Service in the Internet Protocol Suite", published by Network Working Group, Jul. 1992, 28 pages.*

Ullman, R. "Request for Comments (RFC) 1476: RAP: Internet Route Access Protocol", published by Network Working Group, Jun. 1993, 20 pages.*

Stiller, B.; Fankhauser, G; Plattner, B.; Weiler, N., *Charging and Accounting for Integrated Internet Services*, INET Society Conference Paper, Jul. 21, 1998; Geneva, Switzerland.

* cited by examiner

COMPUTER NETWORK PAYMENT SYSTEM

APPLICATION CROSS-REFERENCES

This application claims priority to and is a continuation of International Application No. PCT/GB00/02413 filed Jun. 21, 2000 and published in English. This application also claims priority of Great Britain Patent No. 9914418.0, filed Jun. 22, 1999.

TECHNICAL FIELD

The invention relates to a system and method for transferring payments corresponding to the supply of information over a computer network. In particular the invention relates to a system and method for transmitting payment information between servers and clients by means of a hardware infrastructure of linked routers and by means of a specially adapted protocol. The protocol used by the system and method of the invention is referred to herein as "Packet Tariff Protocol" or "PTP". It is to be understood that the term PTP when used in the following description should be taken to mean a protocol adapted for use with systems which transfer data in packets between servers and clients, the protocol enabling the transmittal of payment information between the servers and clients.

It is also be to understood that the term "packet" when used in the following description should be taken to be a generic term, meaning any discrete package or block of data that is described by any particular protocol, as appropriate to any particular communication layer. For the purposes of the following description the term "packet" should therefore include message, segment, datagram, frame and any other term which by definition or common usage is accepted as meaning a discrete package or block of data in the context of a specific protocol, as appropriate to any particular communication layer.

BACKGROUND OF THE INVENTION

Access to the Internet is freely available everywhere and the advent of e-commerce, or electronic trading, is set to revolutionize the way that business is done. However there remains a requirement for effective trading of information itself. As the infrastructure and available bandwidth expand to appropriate levels, the world will become a single, on-line, global, multimedia library. All public domain information will be available to anyone with a network connection, via a simple, easy to use interface, analogous to today's Web browser application. In addition, suitable tools will be developed to manage the information and tailor all that is available to suit the particular needs of each individual. There are two major consequences of this, as follows.

Firstly, holding information locally will become redundant. This means that books, CDs, prerecorded videotapes and so on will eventually not be required. When information is sufficiently cheap and reaches the necessary levels of specificity and availability, there will be no point in individuals holding local copies of the information, in the form of books, CDs, tapes etc., that will quickly go out of date. They will simply access the latest, updated information from its original source or retrieve other data (noting that any digital multimedia information is fundamentally just data) from on-line archives.

Secondly, broadcast media will also become redundant. Radio stations, TV channels, newspapers and journals will no longer serve any purpose. Once again, highly sophisticated information management tools will retrieve information from the massive range of disparate original sources that will come into existence, with the output collated, rationalized and customized to match the particular requirements of each networked individual.

These changes lie in the future, but are inevitable, and are likely to result in commercial upheaval and colossal social changes. At present, however, there remains a pressing need for a consistent and appropriate system or method to permit the implementation of this trade in information. The system must conform to, and operate under, the conditions that exist within free-market commercial and national economies. It is the development of a proposed solution to this problem, which is addressed by the present invention.

SUMMARY OF THE INVENTION

The PTP or "Packet Tariff Protocol" is an element within an effective system for digital networks at packet level. The protocol is envisaged as, but not limited to, an evolution of the existing TCP/IP (Transmission Control Protocol/Internet Protocol) standard that forms the core of the Internet as it presently exists. However PTP is not limited to TCP/IP applications, but can be used in any environment where there is transfer of data in distinct pieces or packets, for example WAP (Wireless Application Protocol), UMTS (Universal Mobile Telecommunications System), GPRS (General Packet Radio Service) or others.

According to a first aspect of the present invention there is provided a method of electronic payment for data transferred across a computer network containing at least one client, at least one server and at least one router which forwards data, the method comprising the steps of:

sending an electronic data request from a client to a server via one or more routers; and sending electronic data from the server to the client via one or more routers in response to the electronic data request, the electronic data having associated with it a data field containing a value which represents the commercial value of the data contained within the electronic data.

Preferably the electronic data is transmitted in the form of packets. Preferably each of the one or more routers receives an incoming data packet, reads the value in the data field associated with the incoming data packet, calculates a new value based on the read value and the cost of forwarding the data packet, and forwards the data packet with the new value in the associated data field.

Preferably each of the one or more routers checks whether the value in the data field associated with the incoming data packet falls within predefined parameters and rejects the packet if the value falls outside the predefined parameters. The parameters may depend on the source of the data packet or the originator of the data request.

The electronic data request may also have associated with it a data field containing a value, which represents the commercial value of the data contained within the electronic data request.

Preferably total accumulated values for transactions between routers or between routers and servers/clients are recorded. These total values may be used as the basis for payments between the operators and/or users of the routers, servers or clients. Periodic clearance payments may be made between the operators and/or users of the routers, servers or clients, the clearance payments corresponding to the total accumulated values.

According to a second aspect of the present invention there is provided a system of electronic payment for data based on a hardware infrastructure of linked routers, data providers and data users, comprising:

at least one client;

at least one server for providing electronic data in the form of data packets in response to a request from a client and having its operation governed by a server protocol which causes each data packet sent by the server to have associated with it a data field representing the value of the data contained within the packet;

at least one router linked by a hardware infrastructure to the server and the client and having its operation governed by a routing table and a router protocol; and whereby the router protocol causes each router to add commercial value to the packet by forwarding it in accordance with the routing table and to update the value contained in the data field within the packet to reflect this added commercial value.

Preferably the router protocol also includes procedures for rejecting individual packets in accordance with pre-defined parameters related to the value of each packet on receipt.

According to a third aspect of the invention there is provided a method of electronic payment for data transferred across a computer network containing at least one client, at least one server and at least one part of the network which forwards data, the method comprising the steps of:

sending an electronic data request from a client to a server via the part of the network; and sending electronic data from the server to the client via the part of the network in response to the electronic data request, the electronic data having associated with it a data field containing a value which represents the commercial value of the data contained within the electronic data.

Preferably the electronic data is transmitted in the form of packets. Preferably the part of the network has an associated data processor which reads the value in the data field associated with an incoming data packet received by the part of the network, calculates a new value based on the read value and the cost of forwarding the data packet, and forwards the data packet with the new value in the associated data field.

The data processor may check whether the value in the data field associated with the incoming data packet falls within predefined parameters and rejects the packet if the value falls outside the predefined parameters.

According to a fourth aspect of the invention there is provided a method of electronic payment for requested data transferred across a computer network containing at least one client, at least one server and at least one router which forwards data, in which the requested data is sent from the server to the client in the form of a packet, wherein the packet comprises a packet header and packet data, the packet data containing the requested data, and the packet header containing one or more address fields containing address information relating to the client and/or server and a data field containing a value which represents the commercial value of the requested data contained within the packet data.

Preferably the data is sent via the router which reads the value in the data field of the incoming data packet received by the router, calculates a new value based on the read value and the cost of forwarding the data packet, writes the new value to the data field, and forwards the data packet with the new value in the data field.

BRIEF DESCRIPTION OF THE DRAWINGS

The invention will now be described, by way of example only, with reference to the accompanying figures, where.

DETAILED DESCRIPTION OF THE INVENTION

The invention can best be understood by considering the metaphor of the supply chain with associated added value at each stage. In other words, at each step in the process to supply the information, value is added over and above the intrinsic value of the information. Therefore, an additional cost is associated with the information at each stage, until it reaches its ultimate destination. In practice, this is achieved by the incorporation of a "value" field into each data packet, allied with network protocol extensions to implement and utilize this field in the packet. This is applied in a way that ultimately results in the cost of providing the intrinsic information and the cost of providing the transport service being enumerated and accrued in the value field. These costs are thus accounted for within the same system that actually provides the data transport service, so that the supply chain and the value chain are both incorporated into the network protocols.

The value field may be augmented with a "priority" field, along the lines that have already been proposed by other bodies as part of existing technical specifications. Within this framework though, the priority field can additionally be used as part of the commercial system if required, so that different services can incur different costs although they may share the same hardware and network infrastructure. In some prior art developments, the "priority" field of a data packet has evolved to serve a more advanced purpose, and the field contains a code that indicates how data should be handled, according to its characteristics. For example, transmission of data that is part of a video stream might not be re-tried if it fails first time, since a degraded video output is considered to be more useful to the ultimate end-user than a pause to wait for all the information to achieve perfect reproduction. In contrast, a file transfer can usually wait for the availability of network capacity, but must ultimately be one hundred percent complete, accurate and checked if it is to be of practical use.

Figure 1:
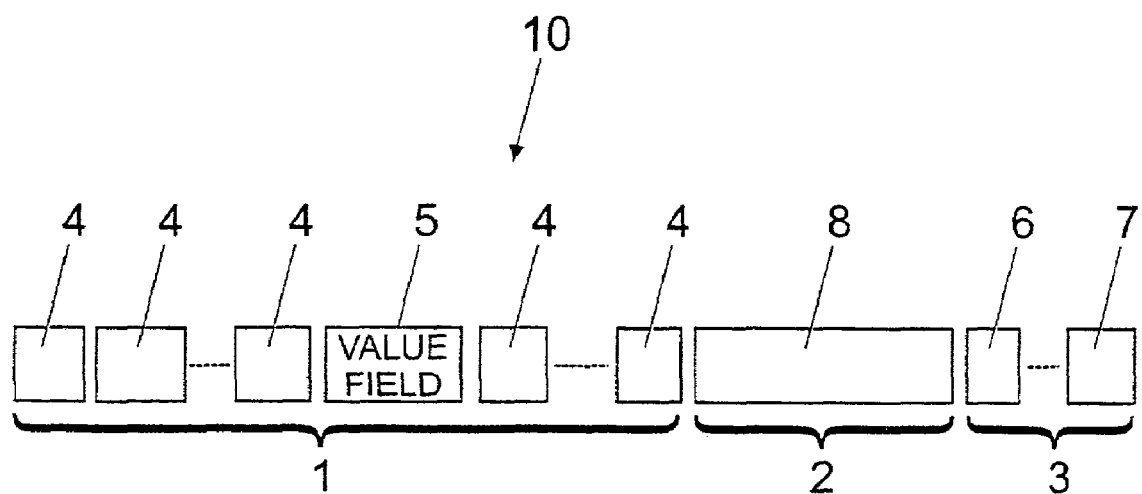
FIG. 1 is a schematic representation of a typical generic form of a digital data packet under the system of the invention.

In the system according to the invention, data is transferred between servers and clients in packets. FIG. 1 shows the typical generic form of a digital data packet under the implementation of PTP.

The packet 10 is simply data in a mutually understood format. In the example of FIG. 1, it is divided into three sections 1, 2, and 3. Each section may be further divided into multiple fields, as described below. The packet header 1 contains general fields 4 for addressing information or other information and also contains a value field 5. The number of general fields 4 depends on the protocol used, and it is to be understood that the number of general fields 4 and the position of the value field 5 within the packet header 1 may vary. The packet data 2 contains the data 8 and follows the packet header 1. The packet tail 3 follows the packet data 2 and is optional, but would typically contain a field 6 containing the checksum for the packet, or similar error detection information, and may contain other general fields 7. Again it is to be understood that the number of general fields 7 and the position of the checksum field 6 within the packet tail 3 may vary. It is to be understood that the value field may be in any position within the packet, for example within the payload or packet data 2, or within the packet tail 3.

Each data packet 10 includes a value field 5, which contains information about the intrinsic value of the data 8 contained within the packet, and which accumulates the charges made for each step in the provision of the service for supplying that data packet to its ultimate recipient. As an example, this aggregated overall worth may be measured in Network Credit Units (NCU's).

For the purpose of applying tariffs, the network system is considered to consist of "servers", "routers" and "clients" although in practice a single machine or even a single software application may fulfill more than one of these functions at different times. For example, a router can be considered to be acting as a client to many servers and as a server to many clients, as defined by the routing tables to which it adheres at any particular moment in time.

Figure 2:
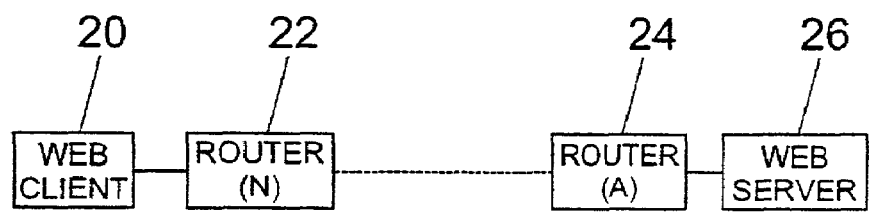
FIG. 2 is a schematic representation of a fragment of a network.

FIG. 2 is a diagram showing a network fragment. Under the system of the invention it may operate in the following manner. The web client 20 operated by the ultimate end user requests information in the form of a message that passes through router (N) 22 at the internet service provider (ISP) connection and accrues added value as a result of the action of the transport service. The message subsequently passes through a number of intermediate routers (not shown) and finally through router (A) 24 and accrues more added value for the extra transport service. The intermediate routers and routers (A) and (N) form the network infrastructure carrying the data. The message then arrives at the web server 26, which responds by initiating a data stream. The web server 26 is operated by a content provider. The packets of this data stream typically have intrinsic value, associated with the information that they contain, the information being provided or sold by the content provider. The appropriate component of this intrinsic value is recorded in each packet. The packets then pass back via router (A) 24 and have the associated value of the transport service added to them. Similarly, router (N) 22 passes the data stream and adds further value to the packets for the service provided. The information finally arrives at the web client 20, as required.

For each machine on the network, the net values of packets received and transmitted via each hardware connection can then be calculated. These values are reconciled by the owners of all the machines involved, as the basis for assessing the economic value of the services provided and calculating the commensurate hard currency exchanges required. This process is described in more detail below.

In accordance with the PTP idea, the web client 20, or any software application functioning as a client, maintains the right to reject individual packets if they are deemed "too expensive" by some criteria, without assuming their associated notional cost. Additional control is maintained by monitoring the value of incoming packets in real time, typically by summing the total value arriving in the last second and/or minute and/or hour and/or other time interval, as required. This might, for example, be depicted by a meter representation or bar indicator on a network terminal screen. Over a short time period, of the order of a few seconds or so, it might be acceptable to have a large amount of data arriving with a large value at a high rate of value accrual, for example when downloading a software application. However over a longer time period, of the order of an hour or so, a high rate of value accrual might be unacceptable while it might be acceptable to have a continuous stream of data arriving with a smaller value, for example when downloading a movie or video in real time. A meter representation could also apply to an Internet telephone, and the system could show the cost of a call as it takes place, rather than the owner subscribing to the service on a predetermined tariff scheme. This does not preclude a service provider agreeing to absorb the fluctuations in cost and passing on packets at agreed rates if such a service is desired by clients on the network. This might be appropriate, for example, if a client actually desired predetermined costs for use of the system, e.g., for budgeting purposes.

The invention is now described in more detail. For the purposes of the description herein, a packet originates from a server that acts as a "content provider", i.e., it is the source of the data or information contained within the packet that is to be transferred. This piece of information and the service of providing it both have some inherent worth and this worth can be enumerated and written in the value field of the packet. This is the first element of the system of the present invention, in that content providers can attach a value to the information that they provide and, further, they can assert the claim to that value along the same delivery channel as that by which the information itself is supplied. On receipt of the packet, the client (or router acting as a client) can accept the packet or reject it. The control system, which makes the decision and determines the outcome of this choice is described later. It is of importance, because information cannot meaningfully be returned once received.

Assuming that a router receives and accepts a packet, it then acts in its role as a server and forwards it in accordance with the routing tables it currently holds. It should be noted that this always entails sending the packet down a physical data connection of some sort. The network is defined by the routing tables, but always has a physical existence as data conduits between machines. In the system of the invention, the routing machine defines the worth associated with the action of passing a packet from one machine to the next. It might be a fixed rate, or it might be dependent on the priority of the packet or on some other parameters (e.g., network loading, time of day, physical distance between machines, available bandwidth, ownership of network infrastructure, etc.). The important point is that this evaluation can be resolved by the router (probably as part of its routing software) as it passes the packet and that the outcome of this calculation is added to the value field of the packet in transition (i.e., before it is forwarded). This is the second element of the system of the present invention, in that network infrastructure providers can attach a value to the service of transporting information and, further, they can assert the claim to that value along the same delivery channel as that by which the information itself is supplied. It is also necessary for each machine to accumulate the total number of NCU's it receives from each physical connection and the total number of NCU's it dispatches to each physical connection, excluding those attributed to packets that are subsequently rejected. It should also be noted that physical connections for the receipt of packets are considered to be distinct from physical connections for the dispatch of packets, even though they might be manifested in the same piece of cabling.

Under these conditions, the number of NCU's transmitted from the machine at one end of a physical connection should agree with the number of NCU's accepted by the machine at the other end. These machines may be owned by different organizations but, on the basis that they agreed to make the trades, they should be reasonably expected to have mutual interest in ensuring accuracy in accounting. A commercial analogy for this would be a deal done on an "open outcry" trading floor, in which two parties agree a deal by signals and each makes a record of it independently. The independent records are reconciled at a later stage but, since both parties agreed the initial deal, both are assumed to have an interest in making sure that it is recorded accurately. The analogy goes further, since any party that establishes a reputation for not recording deals accurately will simply find it impossible to establish or maintain any profitable trades.

Within this protocol, any recipient reserves the right to reject any packet. This rejection includes refusal to accept the debt associated with receipt of the packet. The most probable reason for this is that the packet is deemed by some criteria to be "too expensive". This act of rejection is an important part of the protocol and therefore warrants detailed discussion. As discussed above, once data is received it cannot be meaningfully returned, since it is not a physical object. On first inspection, then, it seems that there would be a propensity to defraud suppliers by rejecting packets (and therefore the liability to pay for them) whilst still forwarding the data and charging for it. However, the post-receipt rejection process is vital to remove completely the possibility that single "rogue" packets of massive value are foisted on unsuspecting recipients. The reason that an immediate breakdown of the system according to the invention does not follow is because successful trading requires streams of many packets of modest value to be passed through the network. In the proposed scenario, the "catch 'em once" price-value combination is excluded by this ability to refuse to pay for excessively costly packets. This means that a sustainable and profitable trade will only occur with the transmission of an ongoing packet stream.

This "reject" aspect of the system according to the invention may best be understood by considering a "sale or return" analogy. A producer (content provider) creates a product (data/information) and delivers it to a reseller (router) at some cost (the value in NCU's). The reseller (router) either accepts it, on the basis that it can be sold on (forwarded to another router or an end client) at a marked up price (an addition to the value in NCU's) or, alternatively, rejects it. The producer (content provider) monitors the rejections of the reseller (router) and decides on the basis of this information whether or not to continue trading and, if so, what price structure to apply. Hence, the choice of acceptance or rejection of a packet is effectively a "sale or return" of the data, since keeping occasional packets without paying for them is of little economic value. In practice, it will rapidly become the case that meaningful trade in packet streams allied to competitive pricing is the only way to maintain profitable transactions.

Termination criteria are based upon single packet costs and the cost accumulations of packets over selected time intervals. Hence termination requests are issued if any single packet exceeds the NCU threshold or if the limits for NCU's per second, minute, hour, day and/or other time interval are exceeded. The cut-off levels are best kept confidential to avoid prices being bumped up to the maximum that would be accepted, although such information could be shared with trusted counterparts in an attempt to reject packets deemed too costly at an earlier stage. Note that single-packet rejection is the only rejection where packets are not paid for, other termination is simply a request to cease supplying data. Data received before supply terminates are still paid for, subject to single packet criteria.

Conversely, the value attributed to data by content providers could be freely advertised. This would make competition between content providers more effective and would also highlight expensive transport routes, since the value of the packet received would have had risen unacceptably when compared to the initial value advertised by the content provider. Furthermore, data network routing should become an extremely efficient market because data transmission networks can be reconfigured so easily and pricing structures changed so readily. This should result in perfect competition, evolving to satisfy the laws of supply and demand in a free market.

The final element of the system according to the invention is achieved by converting the residual difference in NCU's exchanged between a pair of machines over some physical connection into a payment in mutually acceptable hard currency. This can always be achieved bilaterally, but could also be administered by some kind of clearing house with responsibility for a defined physical region of the network. There is a potential problem here, unless the exchange value of an NCU is pegged to some hard currency. Otherwise, it will float erratically as the number of NCU's per network transaction can vary inversely with the exchange rate to hard currency, without changing the actual monetary worth of the network transaction. The problem might however eventually resolve itself if the NCU becomes a stable, global currency in its own right.

To complete a transaction using this system, an ultimate client could first issue a request for some information. For the purpose of this example only, it will be assumed that this request is contained in a single packet. The intrinsic value of this packet would probably be zero but, in all cases, could not exceed a predetermined maximum accepted by the router (which may well be the machine of a network service provider, acting at this point as a client). Further, since this machine is probably not owned by the owner of the ultimate client machine, there would be no tariff added to the value of the packet. The router, now acting as a server, adds a tariff to the packet and passes it to the next router. This process is repeated across the network until the packet reaches the machine of the content provider that, somewhat confusingly, is at this point acting as a client. Hence, the content provider receives a request for information but becomes liable for the accrued value of the packet. This value will be relatively small, since it is only one packet (or, more generally in practice, a relatively small number of packets) and it has little or no intrinsic value in its information content. It can be thought of as analogous to the cost associated with a free-phone telephone number that businesses commonly use to attract enquiries from customers.

The machine of the content provider now acts in its primary role as a server, and starts to send packets addressed to the machine of the ultimate client (i.e., the machine from which the original request for data originated). Since the packets have content that is deemed to have some worth, these packets now have a significant value associated with them even as they are dispatched from the server machine. As they traverse the network, they will accrue further value until they reach the ultimate client machine. Routers within the network will have added value to packets passing both ways, so that owners of these machines will be in residual credit after paying for the packets received and will therefore be able to reclaim hard currency converted from NCU's to finance their activities. The content providers will have some liabilities for the receipt of the packets requesting data but will have a large residual credit for supplying the information. The ultimate client will contribute the majority of the payments due, which cover the cost of the information they receive and the cost of the process of transporting it to them.

Figure 3:
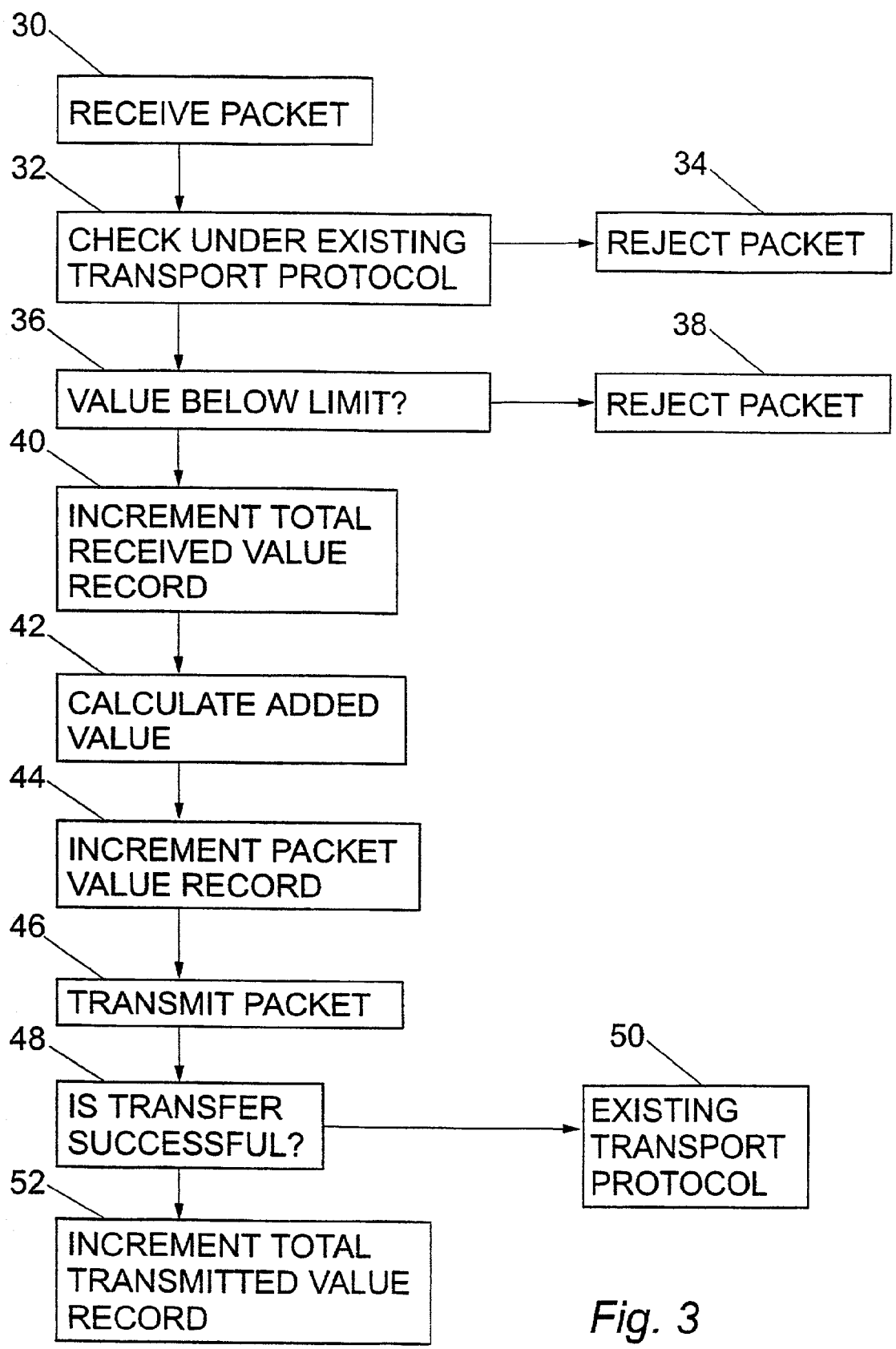
FIG. 3 is a flow chart showing the operation of a network router under the system according to the invention.

The way in which a network router might implement the PTP, in addition to its existing transport protocol, for the purposes of transferring data packets and accumulating the associated tariffs, is illustrated in the flow chart of FIG. 3. The branches in the flow chart show possible contingencies at various stages, if the required conditions are not satisfied.

The router receives 30 a data packet and checks 32 whether the packet is acceptable under the existing transport protocol. The router also checks 32 whether the routing tables with which it is provided can resolve the address to yield the hardware connection along which the packet is to be dispatched. If the packet is acceptable and the address can be resolved the router proceeds to step 36. If the packet is not acceptable or the address cannot be resolved the router rejects 34 the packet.

The router then checks 36 that the value of the packet as determined from the value field 5 is below the value limit acceptable from the incoming hardware connection. If the value of the packet is not below the value limit the router rejects 38 the packet under the PTP rules. If the value of the packet is below the value limit the router proceeds to the next step, in which the recorded total value received from this hardware connection is incremented 40 by the value of the packet. The recorded total value received is stored by the router.

The router then calculates 42 the value to be added for the service of transmitting this packet along the particular hardware connection designated by the routing tables. This might depend upon the infrastructure of the hardware connection, the prevailing network loading, the time of day and many other factors. The router then increments 44 the packet's value field 5, which is the packet's internal record of its own value by this calculated value.

The router then transmits 46 the packet along the hardware connection along which the packet is to be dispatched. Following transmittal the router checks 48 that the recipient machine has acknowledged successful transfer of the packet (assuming the transfer protocol supports this). If the transfer is not successful, then this is handled under the existing transport protocol 50. If the transfer is successful the router increments 52 the recorded total value transmitted to this hardware connection by the value of the packet. The recorded total value transmitted is stored by the router.

For each router or hardware connection, the total value transmitted minus the total value received (e.g., in Network Credit Units) is the net profit (or loss) that must be reconciled with the owner of the machine at the other end of that hardware connection. This is used to determine the economic value of the accumulated transactions and forms the basis of the hard currency exchanges necessary to finance the activities and the provision of the infrastructure.

Physical network connections can be created and re-arranged relatively easily and network service providers can normally be changed at will. It is therefore anticipated that the kind of business system envisaged by the present invention will lead to a very efficient market constituted of very many providers of connections and routing bandwidth who serve, collectively, a very large number of content providers and information consumers. For example, if the financial arrangements were controlled in this manner, it might reasonably be envisaged that the infrastructure would evolve to support video on demand. This would be based upon an enormous supply of material, effectively a distributed archive of all the material ever produced. It would satisfy the market by the laws of supply and demand.

One of the major problems associated with any data distribution, and particularly digital data, is that of unauthorized redistribution. Matters of privacy and security are also general problems in the context of the Internet. For the purposes of the description of the invention, it is necessary only to consider whether the use of PTP implies any changes as compared to the situation at present. The system of the invention does not require transfer of data in ways other than those presently possible, and the proposed protocol of the invention would not inhibit any of the security or encryption methods used to prevent such unauthorized redistribution. In fact, security and encryption would be expected to take place at the level of the data within the packet stream, rather than acting at the packet level itself.

One important feature of the system of the invention is that it allows consumers to choose exactly what they require without having to pay for unwanted accompanying material. For example, they can select one track without having to pay for a complete music CD, or they can decide not to view the remainder of a film if they dislike the opening portion. Also, the purchase price should be subject to very keen competition. These facts in themselves mean that there is less temptation to acquire material from illegal sources. Any legal deterrents become more effective if individuals can buy selectively only what they actually require, and at a fair price.

In addition, as individuals are presented with, and begin to utilize, the much greater choice of available information, their interests will rapidly diversify and their requirements will diverge. This will have the effect of making it more difficult to cache data as it passes through the network and resell it multiple times. If content becomes sufficiently cheap, it will not be worth the investment in hardware to cache it. There will be less demand for any particular content, so that the logistics of illegal storage for reselling become more expensive and therefore less attractive. This is not to say that a legal business of caching and reselling popular information could not build up, still within this framework. This could, for example, be how what are now broadcast services continue to make money. Network capacity will need a large step-change before commonly required content can be served to all clients from a single source, a matter which is presently addressed by the use of network caches, proxy servers and mirror sites on the Web. Such issues are tied in with copyright and ownership of content. For example, it is not generally possible for an end-user to tell whether content comes from its original provider or from some legitimate or illegitimate cache. Once again, the implementation of the system of the invention would not impact upon these matters of copyright and ownership of content.

The system of the invention as described above can also function with the concept of the network computer, which for example means that a user might have the option of purchasing the use of a software application for some period rather than actually buying the application outright. Once again, they receive (and pay for) only what they actually require, and always get the most up to date version so that rapid obsolescence is not a concern.

One other important feature of the PTP concept is that it can be interfaced with a conventional network, operating under a different business model, provided charging rates and so forth are agreed for the interfaces. This means that network fragments can be created or converted to conform to the PTP model as and when suits the infrastructure owner, so that gradual conversion is possible and a massive "rollout" program is unnecessary.

It is possible that, for effective operation, the system of the invention will require international financing deals and clearing arrangements, as well as software controlled real-time network configuration changes and real-time pricing structure changes. However, the system of the invention offers two significant advantages, as follows. Firstly, the ultimate client always has transparent data on what the service being received is actually costing, over any desired time interval. This is regardless of the choice of information source, network service or demand driven costing changes. Secondly, PTP represent a good approximation to a perfectly competitive and efficient market, and one in which the costs and revenues are intimately related at all stages to the actual activities from which they result. These features should be expected to encourage serious investment into infrastructure development.

Particular details of a method of implementing PTP in a TCP/IP environment will now be described. In particular, for the value quantity to be directly accessible for processing by the routers, the value field must be contained in the IP Layer header. This is because the TCP Layer header is considered purely as data by the routers that implement IP protocols and, as such, it is to be transported without any reference to its contents. However, for the value field to be useful to individual client and server applications for the purpose of enumerating the intrinsic worth of the data being transported, it must be accessible to these applications. The applications operate at the Application Layer of the TCP/IP stack and this layer interfaces with the TCP Layer, with the IP Layer being effectively invisible to the application. The matter is further complicated by the existence of UDP (User Datagram Protocol), which provides an alternative protocol at the Transport Layer (and there might be additional alternatives, which either currently exist or will be defined in the future). The invention proposes three solutions to this, as follows.

The first solution is to have separate value fields. According to this solution there are two distinct value fields, one in the IP Layer, to accrue measurement of the economic worth of performing the data transport operation, and one in the Transport Layer, to enumerate the intrinsic worth of the data. Such a solution does not allow the unification of the methods covering the two contributions to the economic model, and so is not the preferred solution.

The second solution is direct communication between the application and the IP Layer. Such communication can be hazardous with respect to the structure and implementation of the TCP/IP protocol and is not generally considered to be a realistic solution. There is a useful exception in the case of an "information server", a system dedicated to serving information on behalf of a content provider and which is accessed by a client dedicated to the task of receiving that information. A server in such a system can run customized application software, in which the direct access to the IP Layer is available as required. The client works solely with the incoming information, so that the resources consumed (and measured in accordance with PTP) on behalf of the client application are indistinguishable from the total resources consumed by the client machine. This is the maximum level of detail that could be measured if the PTP values were accessed directly from the IP Layer, since IP does not work with reference to specific ports or the individual applications which are notionally attached to them.

The third, most favored solution is integration with the Transport Layer. The PTP value field is incorporated in the IP Layer header. The Transport Layer protocol (TCP, UDP or other) is aware of the value field and can convey the information to and from the Application Layer as required, even though this information is not written in the Transport Layer header and thus not considered to be conveyed at the Transport Layer level. The act of reading and writing the value field would still be expected to be the preserve of the IP Layer implementation software. This structuring appears to be analogous to the way in which applications can have access to IP addresses, although these are actually written in to, and read back from, the IP headers.

Practical details in implementing the router functionality required by the PTP system will now be described. Incrementing the value field does not impose an unacceptable processing overhead on the router. There is a precedent for this kind of processing in the way that the IP standard defines and utilizes a time-to-live (TTL) value in the IP header. This is subject to a decrement each time a router hop occurs. This capability can be extended to include a simple addition to the value field at the same point in the processing. This operation is likely to be an integer addition or binary add function on a specific bit field in the packet header, a relatively straightforward procedure. At the same time developments in hardware technology will go some way to compensating for the increased burden placed upon the network infrastructure by the implementation of PTP. Dedicated hardware may be used to support the value field modification. Since there is an intimate relationship between the physical network connections and the particular value of the increment to be applied, an appropriate piece of equipment can be placed "in line" on each physical network connection, to perform the task. Such a unit can respond to its own communications protocol (something akin to the way routers work with ICMP (Internet Control Message Protocol), ARP (Address Resolution Protocol) and RARP (Reverse Address Resolution Protocol)) to receive updates to the algorithm for the value to be added to passing packets and also to return accumulated totals at appropriate times. Otherwise it operates as a standalone piece of network infrastructure, logging and incrementing the values of passing packets. Such a configuration alleviates the need for routers to allocate the accumulating values to particular network connections or IP addresses in real time, as they process the packets.

In addition, it is also possible that, rather than each and every router performing its own increment to the value field, a more "coarse grained" implementation of the PTP model could be applied. This would occur if the provider of a particular piece of infrastructure were willing to consider that piece of infrastructure (e.g., an optical fiber "backbone") as a zone and therefore apply a more straightforward tariff for transportation across the zone. This would mean that the logging and increasing of the value fields of packets transported across the zone would only need to take place at the zone boundaries. This scheme is effectively equivalent to considering the flow chart of FIG. 3 to apply to a network zone rather than an individual router.

These and other modifications and improvements can be incorporated without departing from the scope of the invention.

The invention claimed is:

1. A method of electronic payment for data transferred across a computer network containing at least one client, at least one server and at least one router which forwards data, the method comprising the steps of:

sending an electronic data request from a client to a server via one or more routers;

sending electronic data in the form of data packets from said server to said client via one or more routers in response to said electronic data request;

whereby the operation of the server is governed by a server protocol which causes the data packet sent from the server to have associated with it a data field containing a value which represents an intrinsic value of the electronic data in the data packet; and whereby each of said one or more routers has a router protocol which causes each router to forward the data packet in accordance with a routing table and to update the value contained in the data field by increasing the value to reflect an aggregated overall worth of the electronic data in the data packet associated with the action of forwarding the data packet.

2. The method according to claim 1, wherein each of said one or more routers receives an incoming data packet, containing electronic data and a data field associated with the electronic data in the incoming data packet, reads the value in the data field, calculates a new value based on the read value and the cost of forwarding the data packet, arid forwards the data packet with the new value in the associated data field.

3. The method according to claim 2, wherein each of said one or more routers checks whether the value in the data field associated with the electronic data in the incoming data packet falls within predefined parameters and rejects the packet if the value falls outside the predefined parameters.

4. The method according to claim 1, wherein the electronic data request has associated with it a data field containing a value which represents the commercial value of the data contained within the electronic data request.

5. The method according to claim 1, wherein total accumulated values for transactions between routers or between routers and servers/clients are recorded.

6. The method according to claim 5, wherein clearance payments are made between the operators and/or users of the routers and servers/clients, the clearance payments corresponding to the total accumulated values.

7. A system of electronic payment for data based on a hardware infrastructure of linked routers, data providers and data users, comprising:

at least one client;

at least one server for providing electronic data in the form of data packets in response to a request from a client and having its operation governed by a server protocol which causes each data packet sent by the server to have associated with it a data field containing a value which represents an intrinsic value of the electronic data in the data packet;

at least one router linked by a hardware infrastructure to said server and said client and having its operation governed by a routing table and a router protocol; and whereby the router protocol causes each router to forward a data packet in accordance with the routing table and to update the value contained in the data field within the packet by increasing the value to reflect an aggregated overall worth of the electronic data in the data packet associated with the action of forwarding the data packet.

8. The system according to claim 7, wherein the router protocol also includes procedures for rejecting individual packets in accordance with pre-defined parameters related to the value of each packet on receipt.

9. The method according to claim 1, wherein at least one of said one or more routers has an associated data processor which reads the value in the data field associated with an incoming data packet received by said at least one of said one or more routers, calculates a new value based on the read value and the cost of forwarding the data packet, and forwards the data packet with the new value in the associated data field.

10. The method according to claim 9, wherein the data processor checks whether the value in the data field associated with the incoming data packet falls within predefined parameters and rejects the packet if the value falls outside the predefined parameters.

11. The method according to claim 1, in which the requested data is sent from said server to said client in the form of a packet, wherein said packet comprises a packet header and packet data;

the packet data containing the requested data; and the packet header containing one or more address fields containing address information relating to the client and/or server and a data field containing a value which represents the commercial value of the requested data contained within the packet data.

12. The method according to claim 11, wherein the data is sent via the router which reads the value in the data field of the incoming data packet received by the router, calculates a new value based on the read value and the cost of forwarding the data packet, writes the new value to the data field, and forwards the data packet with the new value in the data field.

* * * * *

UNITED STATES PATENT AND TRADEMARK OFFICE
CERTIFICATE OF CORRECTION

PATENT NO. : 7,222,193 B2
APPLICATION NO. : 10/039565
DATED : May 22, 2007
INVENTOR(S) : Andrew Mark Stringer Page 1 of 1

It is certified that error appears in the above-identified patent and that said Letters Patent is hereby corrected as shown below:

In Column 13, Line 23, replace "arid" with -- and --.

Signed and Sealed this

Sixteenth Day of October, 2007

JON W. DUDAS
*Director of the United States Patent and Trademark Office*